United States Patent
Ohhashi (10) Patent No.: US 9,535,662 B2
(45) Date of Patent: Jan. 3, 2017

(54) DATA PROCESSING APPARATUS AND DATA PROCESSING METHOD

(71) Applicant: Hideki Ohhashi, Kanagawa (JP)

(72) Inventor: Hideki Ohhashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 357 days.

(21) Appl. No.: 14/021,012

(22) Filed: Sep. 9, 2013

(65) Prior Publication Data

US 2014/0082581 A1 Mar. 20, 2014

(30) Foreign Application Priority Data

Sep. 18, 2012 (JP) .................................. 2012-204253

(51) Int. Cl.
G06F 9/44 (2006.01)

(52) U.S. Cl.
CPC .. *G06F 8/00* (2013.01); *G06F 8/30* (2013.01)

(58) Field of Classification Search
CPC .. H04L 41/082; H04L 65/1069; G06F 21/305; G06F 3/1258; G06F 3/1288; G06F 3/1253; G06F 8/30
See application file for complete search history.

(56) References Cited

U.S. PATENT DOCUMENTS

| | | | | |
|---|---|---|---|---|
| 6,639,687 B1* | 10/2003 | Neilsen | ............... | G06F 11/0715 358/1.1 |
| 7,415,707 B2* | 8/2008 | Taguchi | .................... | G06F 8/61 717/174 |
| 7,802,246 B1* | 9/2010 | Kennedy | .................. | G06F 8/61 717/173 |
| 8,432,562 B2 | 4/2013 | Ando et al. | | |
| 2002/0184499 A1* | 12/2002 | Taguchi | .................... | G06F 8/61 713/168 |
| 2006/0067360 A1* | 3/2006 | Ohara | .................. | H04L 41/082 370/465 |

(Continued)

FOREIGN PATENT DOCUMENTS

JP 2003-283717 10/2003
JP 2005-269619 9/2005

(Continued)

OTHER PUBLICATIONS

Francis, Gregory. "Designing multifunction displays: An optimization approach." International Journal of Cognitive Ergonomics 4.2 (2000): 107-124. Retrieved on [Sep. 18, 2016] Retrieved from the Internet: URL<https://pdfs.semanticscholar.org/a58f/d1956c60b6844c410edc7741c31a720b4630.pdf>.*

(Continued)

*Primary Examiner* — Thuy Dao
*Assistant Examiner* — Cheneca Smith
(74) *Attorney, Agent, or Firm* — IPUSA, PLLC (57) ABSTRACT

A data processing apparatus includes a first program that causes the data processing apparatus to perform a display of a first screen relating to a process using hardware specific to the data processing apparatus, and to perform the process in accordance with setting data input via the first screen, includes an interface that receives setting data relating to the process from a second program, and causes the data processing apparatus to perform the process in accordance with the setting data received from the second program.

14 Claims, 7 Drawing Sheets

(56) References Cited

U.S. PATENT DOCUMENTS

| | | | |
|---|---|---|---|
| 2006/0132835 A1* | 6/2006 | Nagaraja | G06F 3/1205 358/1.15 |
| 2007/0198999 A1 | 8/2007 | Ohhashi | |
| 2009/0201546 A1* | 8/2009 | Ohashi | H04N 1/00236 358/1.15 |
| 2010/0328720 A1* | 12/2010 | Suzuki | G06F 3/1204 358/1.15 |
| 2011/0103819 A1 | 5/2011 | Sekiya | |
| 2011/0145843 A1 | 6/2011 | Ohhashi et al. | |
| 2012/0263380 A1* | 10/2012 | Terao | G06F 17/2217 382/182 |
| 2013/0268925 A1* | 10/2013 | Fuse | G06F 8/65 717/170 |

FOREIGN PATENT DOCUMENTS

| | | |
|---|---|---|
| JP | 2009-282777 | 12/2009 |
| JP | 2011-101142 | 5/2011 |

OTHER PUBLICATIONS

Hecht, David L. "Printed embedded data graphical user interfaces." Computer 34.3 (2001): 47-55. Retrieved on [Sep. 18, 2016] Retrieved from the Internet: URL<http://ieeexplore.ieee.org/document/910893/?arnumber=910893>.*

* cited by examiner

EXTENDED COPY/OUTPUT — 500a

SET DEVICE/DESTINATION

| BASIC SETTING | QUALITY SETTING | COLOUR SETTING | | FOR ADMINISTRATOR |
|---|---|---|---|---|
| MONOCHROME, ... 200dbi AUTO | DEVICE | | | |
| CONDITION | DESTINATION | | | |
| ▲ ⋮ ▼ | FILE SETTING | FILE FORMAT: MULTI TIFF, .... | | |
| ⋮ | PRINTING NUMBER | 1 | | |
| ®®⋮ | SIZE | AUTO | | |
| ⋮ | MIRROR | NO | | |
| ⋮ | ROTATION | NO | | |

DATA PROCESSING APPARATUS AND DATA PROCESSING METHOD

BACKGROUND OF THE INVENTION

1. Field of the Invention

The present invention relates to a data processing apparatus and a data processing method.

2. Description of the Related Art

A data processing apparatus such as a so-called multi-function device or a uniting device including an open Application Program Interface (API) and an application platform that provides an execution environment for an application developed by using the API is known (see, Patent Document 1, for example). Hereinafter, the application platform is referred to as a "Software Development Kit platform" or "SDK platform" and the application is referred to as an "SDK application".

For the SDK platform, an API for enabling the SDK application to provide a function similar to that provided by standard application is open to the public. Thus, it is possible to use a function via an operation screen different from the standard application but similar to that provided by the standard application. In other words, while basically using the standard application, an operation screen, different from the standard application, can be used.

In the conventional SDK platform, there is a merit in that new SDK application, implemented or developed by a third vender, a manufacturer, a software house or the like using the API of the SDK platform, can be additionally mounted on a data processing apparatus even after the data processing apparatus is shipped. However, in order to open the API that provides functions that are the same as those provided by the standard application, it is necessary to implement functions similar to those of the standard application to the SDK platform. Thus, implementations are overlapped between the SDK platform and the standard application and it is inefficient in the development or maintenance of the entirety of the data processing apparatus.

This problem is not limited to an embodiment of the SDK and is a common problem for an embodiment in which processes are performed by a device using application developed by open API.

PATENT DOCUMENT

[Patent Document 1] Japanese Laid-open Patent Publication No. 2005-269619

SUMMARY OF THE INVENTION

The present invention is made in light of the above problems, and provides a data processing apparatus and a data processing method capable of improving efficiency in developing the entirety of software of the data processing apparatus.

According to an embodiment, there is provided a data processing apparatus including a first program that causes the data processing apparatus to perform a display of a first screen relating to a process using hardware specific to the data processing apparatus, and to perform the process in accordance with setting data input via the first screen, includes an interface that receives setting data relating to the process from a second program, and causes the data processing apparatus to perform the process in accordance with the setting data received from the second program.

According to another embodiment, there is provided a data processing method performed by a data processing apparatus including a first program that causes the data processing apparatus to perform a display of a first screen relating to a process using hardware specific to the data processing apparatus, and to perform the process in accordance with setting data input via the first screen, and includes an interface that receives setting data relating to the process from a second program, the method including causing, by the first program, the data processing apparatus to perform the process in accordance with the setting data received from the second program.

Note also that arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

Figure 1:
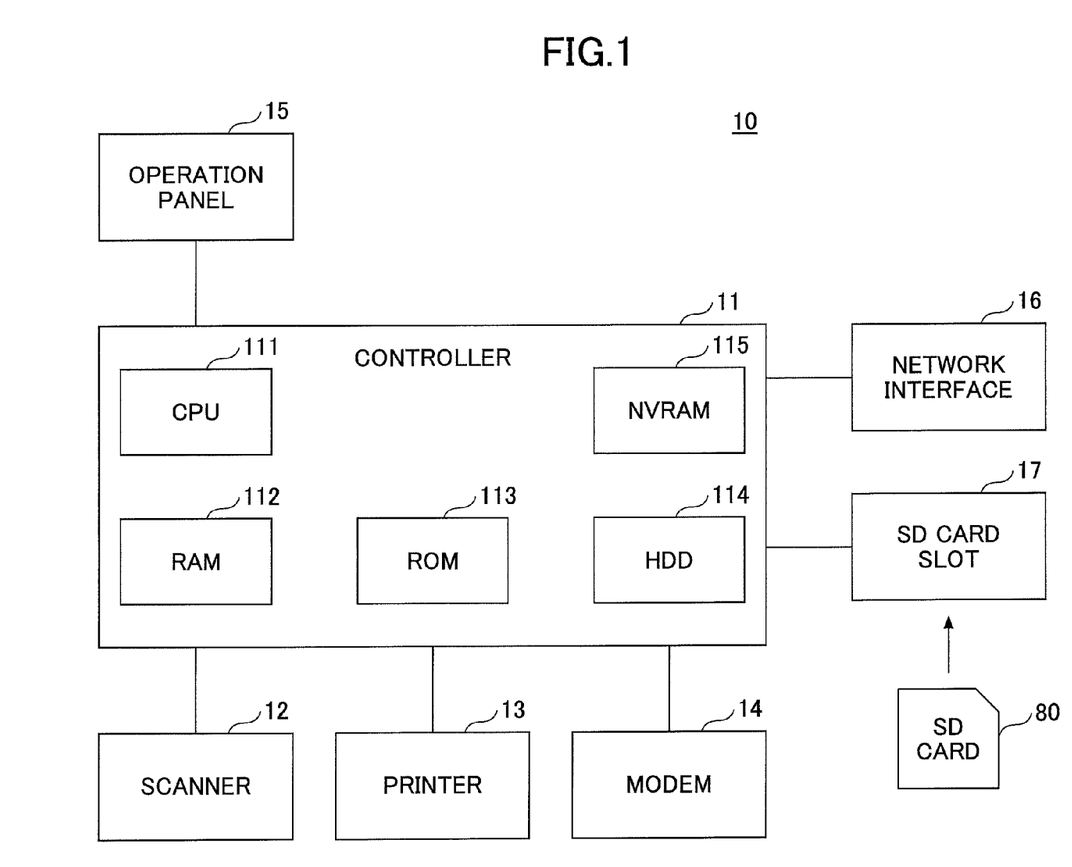
FIG. 1 is a block diagram illustrating an example of a hardware structure of an image forming apparatus of an embodiment.

FIG. 1 is a block diagram illustrating an example of a hardware structure of an image forming apparatus 10 of the embodiment. The image forming apparatus 10 includes hardware such as a controller 11, a scanner 12, a printer 13, a modem 14, an operation panel 15, a network interface 16, an SD card slot 17 and the like. The controller 11 includes a CPU 111, a RAM 112, a ROM 113, a HDD 114, a NVRAM 115 and the like.

The ROM 113 stores various programs, data that are used by the programs and the like. The RAM 112 provides a memory area to load a program, a work area for the loaded program and the like. The CPU 111 actualizes various functions by executing the program loaded on the RAM 112. The HDD 114 stores programs, data used by the programs and the like. The NVRAM 115 stores various setting data and the like.

The scanner 12 is hardware (image reading unit) to read image data from a document. The printer 13 is hardware (printing unit) to print print data on a printing paper or the like. The modem 14 is hardware to connect to a telephone line and is used to perform sending and receiving of image data by a facsimile communication.

The operation panel 15 is hardware including an input unit such as a button or the like to accept an input from a user, a display unit such as a liquid crystal panel, or the like. The liquid crystal panel may include a touch panel function. At this time, the liquid crystal panel functions as the input unit as well. The network interface 16 is hardware to connect to a wired or wireless network such as LAN or the like.

The SD card slot 17 is used to read a program stored in an SD card 80. For the image forming apparatus 10, the program stored in the SD card 80 may be loaded on the RAM 112 to be executed in addition to the program stored in the ROM 113. Here, the SD card slot 17 may be substituted by hardware to read a program or the like stored in another recording medium other than the SD card 80 such as, for example, a CD-ROM, a Universal Serial Bus (USB) memory or the like.

Figure 2:
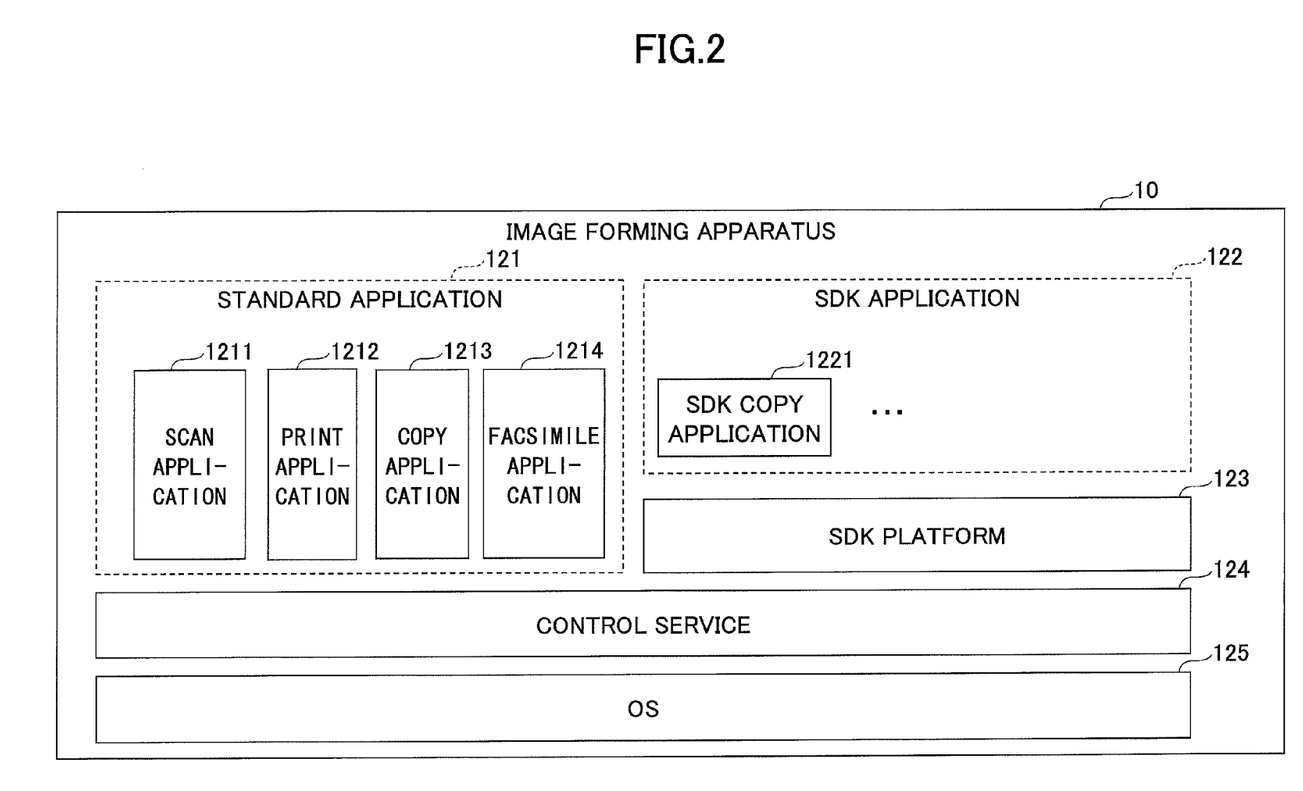
FIG. 2 is a block diagram illustrating an example of a software structure of the image forming apparatus of the embodiment.

FIG. 2 is a block diagram illustrating an example of a software structure of the image forming apparatus 10 of the embodiment. The image forming apparatus 10 includes standard application 121, SDK application 122, an SDK platform 123, a control service 124, OS 123 and the like.

The standard application 121 is a group of application programs that are previously implemented on the image forming apparatus 10 as a standard when being shipped. In FIG. 2, scan application 1211, print application 1212, copy application 1213 and facsimile application 1214 are exemplified as the standard application 121. The scan application 1211 performs a scan job using the scanner 12 or the like. The print application 1212 performs a print job using the printer 13 or the like. The copy application 1213 performs a copy job using the scanner 12, the printer 13 or the like. The facsimile application 1214 performs a sending job or a receiving job of facsimile using the modem 14 or the like. Here, the scanner 12, the printer 13, the modem 14 and the like are an example of the hardware specific to the image forming apparatus 10.

The control service 124 is a group of software modules that provide functions to control various hardware resources or the like to upper application or the like. The control service 124 includes, for example, a function relating to a network communication, a control function of the scanner 12, a control function of the printer 13, management functions of the memories (the RAM 112, the ROM 113, the NVRAM 115 or the like), or the like.

The SDK application 122 is an application program (referred to as a plug-in as well.) that is additionally installed to expand capability of the image forming apparatus 10 after the image forming apparatus 10 is shipped. In FIG. 2, the SDK copy application 1221 is exemplified as an example of the SDK application 122. The SDK copy application 1221 is one of the SDK application 122 that is generated for using the copy function via an operation screen different from that provided by the copy application 1213. This means that the SDK copy application 1221 displays an operation screen that is different from that displayed by the copy application 1213, and causes the image forming apparatus 10 to perform a copy job in accordance with the job parameter input via the operation screen. The job parameter is a parameter that composes setting data for jobs such as the copy job or the like.

The SDK platform 123 includes an Application Program Interface (API) for developing the SDK application 122 and provides an execution environment for the SDK application 122. The API may be in a form of a function, an object oriented class, a method of the class, or the like. An API provided by the SDK platform 123 is referred to as an "SDKAPI". For example, the SDK platform 123 provides an SDKAPI relating to the scan function, an SDKAPI relating to the print function, an SDKAPI relating to the copy function or the like to the SDK application 122. The SDKAPIs are open to the public and the SDK application 122 may be developed by a third vender or the like. The SDK platform 123 may include a Java (registered trademark) Virtual Machine (VM). At this time, the SDK application 122 may be implemented by a Java (registered trademark) language.

The OS 123 is a so-called Operating System (OS). Each software on the image forming apparatus 10 is operated as a process or a thread on the OS 123.

Subsequently, a relationship between the copy application 1213 and the SDK copy application 1221 is explained.

Figure 3:
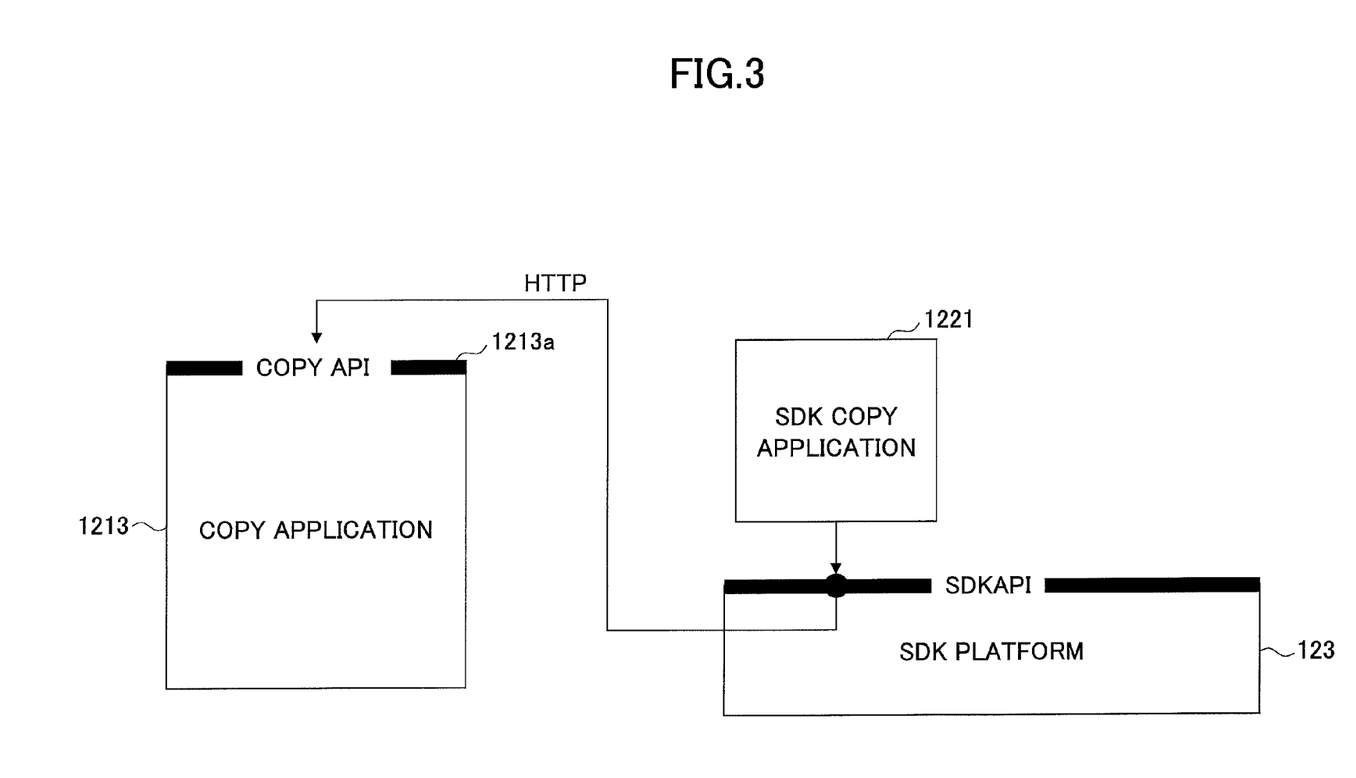
FIG. 3 is a view for explaining an example of a relationship between copy application and SDK copy application.

FIG. 3 is a view for explaining an example of the relationship between the copy application 1213 and the SDK copy application 1221.

The copy application 1213 (an example of a first program) includes copy API (Application Programming Interface) 1213a (an example of an interface of the first program). The copy API 1213a is an API based on HyperText Transfer Protocol (HTTP) (hereinafter, simply referred to as "Web API") that makes the functions of the copy application 1213 usable by other programs. By composing the copy API 1213a as the Web API, limitations relating to programming language (development language) for other programs that use the copy API 1213a can be suppressed. For example, it is possible to call the copy API 1213a easily by a program implemented by Java (registered trademark) language even when the copy application 1213 is implemented by C language. Further, it is possible to call the copy API 1213a via a network.

When the SDK copy application 1221 (an example of the second program) calls the SDKAPI relating to the copy function, the SDK platform 123 calls the copy API 1213a corresponding to the SDKAPI via HTTP. It means that the SDKAPI corresponding to the copy API 1213a in the SDK platform 123 is equivalent to an API that wraps the SDKAPI. Thus, implementation of the SDKAPI relating to the copy function is substantially common with implementation of the copy application 1213.

Another embodiment in which the SDK copy application 1221 directly calls the copy API 1213a may be adopted. However, the status of the SDK copy application 1221 can be easily grasped by the SDK platform 123 when the SDK copy application 1221 calls the copy API 1213a via the SDKAPI.

The copy API 1213a may not be necessarily the Web API. For example, the copy API 1213a may be an API that depends on a specific programming language when such a dependency on the programming language is permitted.

Further, for other standard application 121 such as the scan application 1211, the print application 1212, the facsimile application 1214 or the like, similar to the copy application 1213, an API relating to a function specific to the application may be open to the public.

Figure 4:
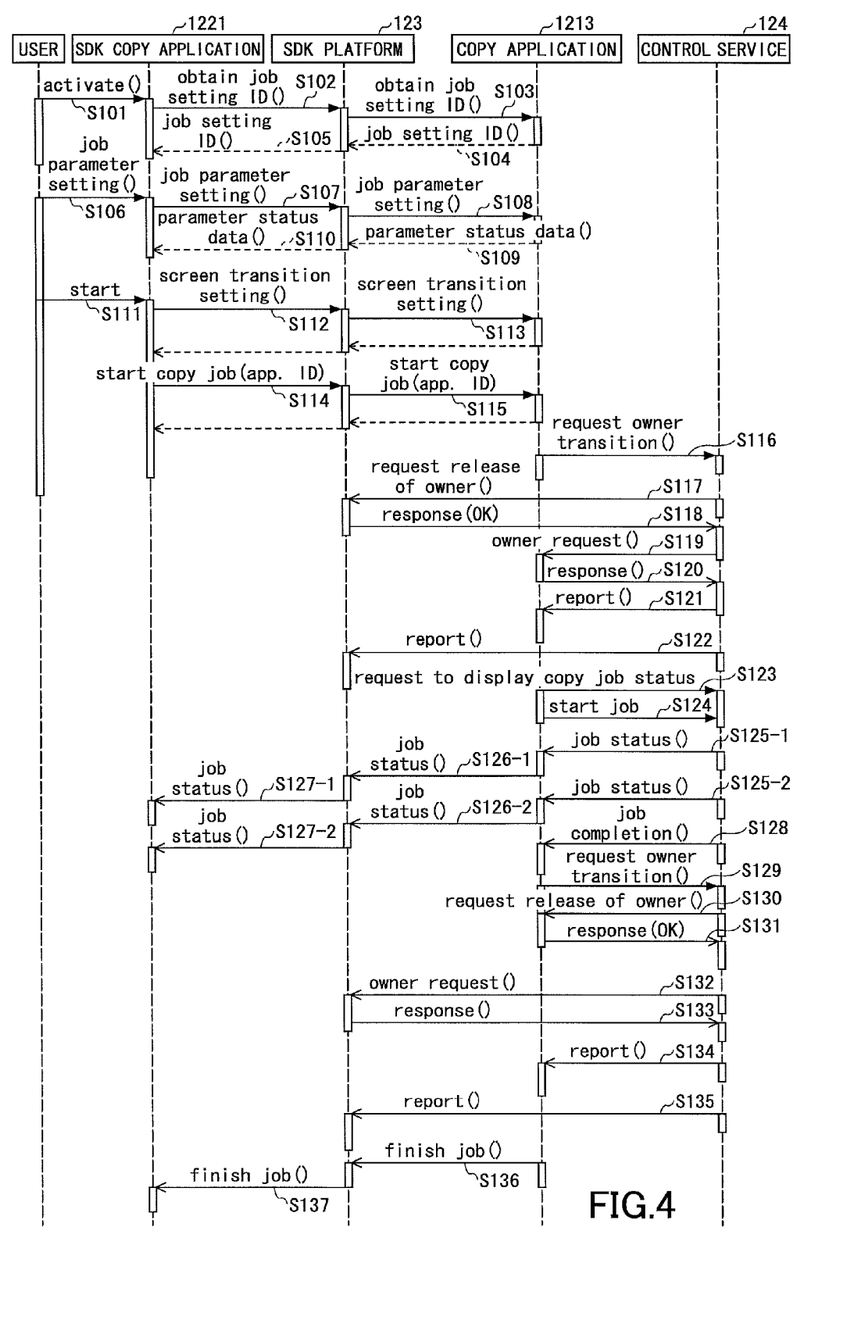
FIG. 4 is a sequence diagram illustrating an example of an operation of the image forming apparatus relating to a copy job.

An operation of the image forming apparatus 10 is explained in the following. FIG. 4 is a sequence diagram illustrating an example of the operation of the image forming apparatus 10 relating to the copy job. Here, an example in which the SDK copy application 1221 is selected as an application to be operated or used is explained. In FIG. 4, data are transmitted via the SDKAPI between the SDK copy application 1221 and the SDK platform 123. Data are transmitted via the copy API 1213a between the SDK platform 123 and the copy application 1213 as explained above with reference to FIG. 3.

In step S101, when an instruction to activate the SDK copy application 1221 is selected via a list screen of the SDK application 122 displayed on the operation panel 15, the SDK copy application 1221 is activated as a thread, for example (S101). The SDK copy application 1221 causes the operation panel 15 to display an operation screen of the SDK copy application 1221 (hereinafter, referred to as an "SDK copy operation screen") in response to the activation.

Subsequently, the SDK copy application 1221 requests the SDK platform 123 to obtain job setting ID (S102). Then, the SDK platform 123 requests the copy application 1213 to obtain the job setting ID (S103). Here, the job setting ID is identification data to uniquely manage a job parameter set by each of the SDK applications in the copy application 1213. For example, when there is SDK application (hereinafter, referred to as "SDK copy application 1221B") other than the SDK copy application 1221 as SDK application for performing the copy job, the job setting ID are used by the copy application 1213 to differentiate the job parameter received by the SDK copy application 1221 and the job parameter received by the SDK copy application 1221B as the identification data. However, if it is unnecessary to differentiate the job parameters between the SDK copy application 1221 and the SDK copy application 1221B, the job setting ID is also unnecessary.

The copy application 1213 generates the job setting ID and sends back the generated job setting ID to the SDK platform 123 (S104). The SDK platform 123 sends back the job setting ID to the SDK copy application 1221 (S105).

Subsequently, one of job parameters relating to the copy job is input by a user via the SDK copy operation screen (S106). This means that processes of steps S106 to S110 are performed every time setting to one of the job parameters is input.

The job parameter relating to the copy job is, for example, the number of copies, gathering (two in one, four in one or the like), color setting or the like. Basically, items that are capable of being set by the SDK copy operation screen are equal to items that are expected for the copy application 1213 to set or capable of being set for the copy application 1213. However, an item that is not expected for the copy application 1213 to set or the like may be included. At this time, a process relating to such an item may be completed without using the copy application 1213. For example, it is assumed that the SDK copy application 1221 has a function in which scanned image data is sent to a predetermined destination in the middle of the copy job, and the destination is capable of being set as the item in the SDK copy operation screen. At this time, the scanned image data may be sent to the destination by a request to send the scanned image data sent from the SDK copy application 1221 to the control service 124 without passing through the SDK platform 123.

The SDK copy application 1221 inputs a setting request of the job parameter including a parameter name of the set job parameter, the value of the parameter, the job setting ID or the like in accordance with the setting of the job parameter by the user in the SDK platform 123 (S107). The SDK platform 123 transmits the setting request to the copy application 1213 (S108).

The copy application 1213 updates a setting status of the setting of a group of job parameters stored in the RAM 112 in correspondence with the job setting ID included in the setting request. Specifically, the value of the job parameter corresponding to the parameter name included in the setting request is updated by the value included in the setting request. Thus, the copy application 1213 manages the current setting status of the job parameter. Here, the copy application 1213 grasps relationships between the job parameters such as an essential relationship, an exclusive relationship or the like. Thus, the copy application 1213 is capable of updating a value of another job parameter in accordance with a value of a certain job parameter, if necessary. As an example of the essential relationship, a relationship between "staple" and "sort" can be exemplified because when "staple" is selected, it is essential to select "sort" at the same time. As an example of the exclusive relationship, a relationship between "two in one" (two pages are gathered in one page) and "four in one" (four pages are gathered in one page) can be exemplified because these cannot be selected at the same time.

Subsequently, the copy application 1213 sends back parameter status data to the SDK platform 123 (S109). Then, the SDK platform 123 sends back the parameter status data to the SDK copy application 1221 (S110).

The parameter status data includes a setting value for each of the job parameters. The parameter status data sent back to the SDK platform 123 may be a difference with respect to the parameter status data that is sent back to the SDK platform 123 in a previous process of step S109. For example, when setting of "staple" (ON for "staple") is requested in step S108, parameter status data indicating that "staple" and "sort" are set is sent back to the SDK platform 123 in step S109.

Alternatively, the parameter status data may include data for all of the job parameters relating to the copy job. Further, alternatively, a copy API 1213a in which only the difference of the parameter status data is sent back and a copy API 1213a in which all of the parameter status data are sent back are prepared, and either one may be selected by a side that calls the copy API 1213a.

The SDK copy application 1221 updates a display status of the SDK copy operation screen based on the sent back parameter status data.

Further, in this embodiment, timing when a screen displayed by the copy application 1213 is automatically transited from the SDK copy operation screen displayed by the SDK copy application 1221 is set. This timing is referred to as a "screen transition setting".

For the screen transition setting, for example, timing when the copy job is started, timing when the copy job is terminated due to a generation of an error or the like, not to transit, or the like may be set. In this embodiment, an example in which the screen transition setting is set when a start key (start button) of the operation panel 15 is pushed is explained. Alternatively, the screen transition setting may be previously set before the start key of the operation panel 15 is pushed.

When setting of the job parameter is completed and the start key of the operation panel 15 is pushed (S111), the SDK copy application 1221 inputs a setting request of the screen transition setting in the SDK platform 123 (S112). Here, it is assumed that the timing when the copy job is started is set as the screen transition setting.

Subsequently, the SDK platform 123 transmits the setting request of the screen transition setting to the copy application 1213 (S113). The copy application 1213 stores the screen transition setting in the RAM 112, for example.

Subsequently, the SDK copy application 1221 inputs a starting request of the copy job in the SDK platform 123 by designating the application ID of its own (application ID of the SDK copy application 1221) (S114). The SDK platform 123 transmits the starting request to the copy application 1213 (S115). The application ID is identification data of the application program in the image forming apparatus 10. Unique application ID is allocated to each of the SDK application 122, the SDK platform 123 and the standard applications 121, respectively.

The copy application 1213 stores the application ID designated in the starting request of the copy job as the application ID of the SDK application 122 that has requested the starting request in the RAM 112, for example.

Then, as described above, as it is assumed that the timing when the copy job is started is set as the screen transition setting, the copy application 1213 requests transition of an owner of the operation panel 15 to the control service 124 by designating the application ID of its own in accordance with the starting request of the copy job (S116). The owner of the operation panel 15 (hereinafter, simply referred to as an "owner") means a subject that occupies display permission of data on the operation panel 15. That is, according to the embodiment, only a single application program is capable of displaying data on the operation panel 15 at the same time. The owner has been the SDK platform 123. Here, for cases when the timing when the copy job is started is not set as the screen transition setting, for example, the timing when the copy job is terminated due to a generation of an error or the like, not to transit or the like is set as the screen transition setting, the copy application 1213 does not request a transition of an owner of the operation panel 15 to the control service 124 in step S116.

Subsequently, the control service 124 requests the SDK platform 123 to release the owner (S117). Here, the control service 124 cannot differentiate each SDK application 122 so that the control service 124 sees the SDK platform 123 as a single application program, similar to each of the standard application 121. Thus, for the control service 124, the SDK platform 123 becomes the owner when either one of the SDK application 122 displays data on the operation panel 15. The SDK platform 123 manages which of the SDK application 122 displays data on the operation panel 15.

Subsequently, when it is possible to release the owner, the SDK platform 123 sends back a response indicating that the owner is to be released to the control service 124 (S118). Subsequently, the control service 124 requests the copy application 1213 that corresponds to the application ID designated in the request of transition of the owner in step S116 to transit to be the owner (S119). The copy application 1213 sends back a response indicating that the owner is to be transited, to the control service 124 (S120).

Subsequently, the control service 124 reports a fact that the owner is transited by designating the application ID of the copy application 1213, that is the new owner, to the copy application 1213 and the SDK platform 123, respectively (S121 and S122).

Here, the owner of the operation panel 15 becomes a designation to report a pushing event or the like of various hard keys (buttons) of the operation panel 15 in addition to have the display permission of data on the operation panel 15. Thus, by transitioning the owner to the copy application 1213, the SDK copy application 1221 and the SDK platform 123 can transfer the control in accordance with the pushing operation of the hard key of the operation panel 15 while performing the copy job, to the copy application 1213. That is, a necessity to implement for such control is lowered for the SDK platform 123.

The copy application 1213 requests the control service 124 to display a screen (hereinafter, referred to as a "job status reporting screen") for reporting a copy job status, in accordance with a fact that the copy application 1213 becomes the owner (S123). The control service 124, in response to the request, transits a screen to be displayed from the SDK copy operation screen to the job status reporting screen.

Figure 5A:
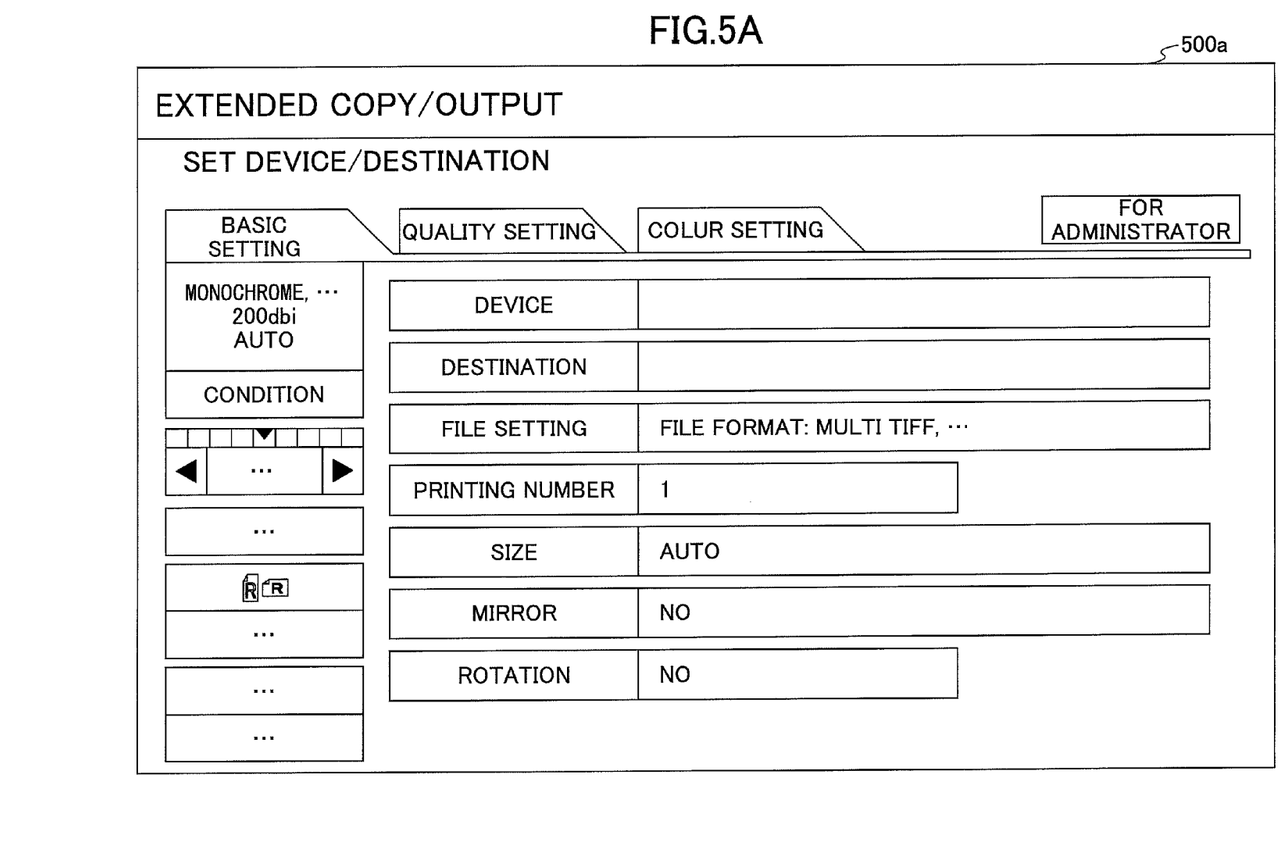
FIG. 5A to FIG. 5C are views illustrating an example of screen transitions.
Figure 5B:
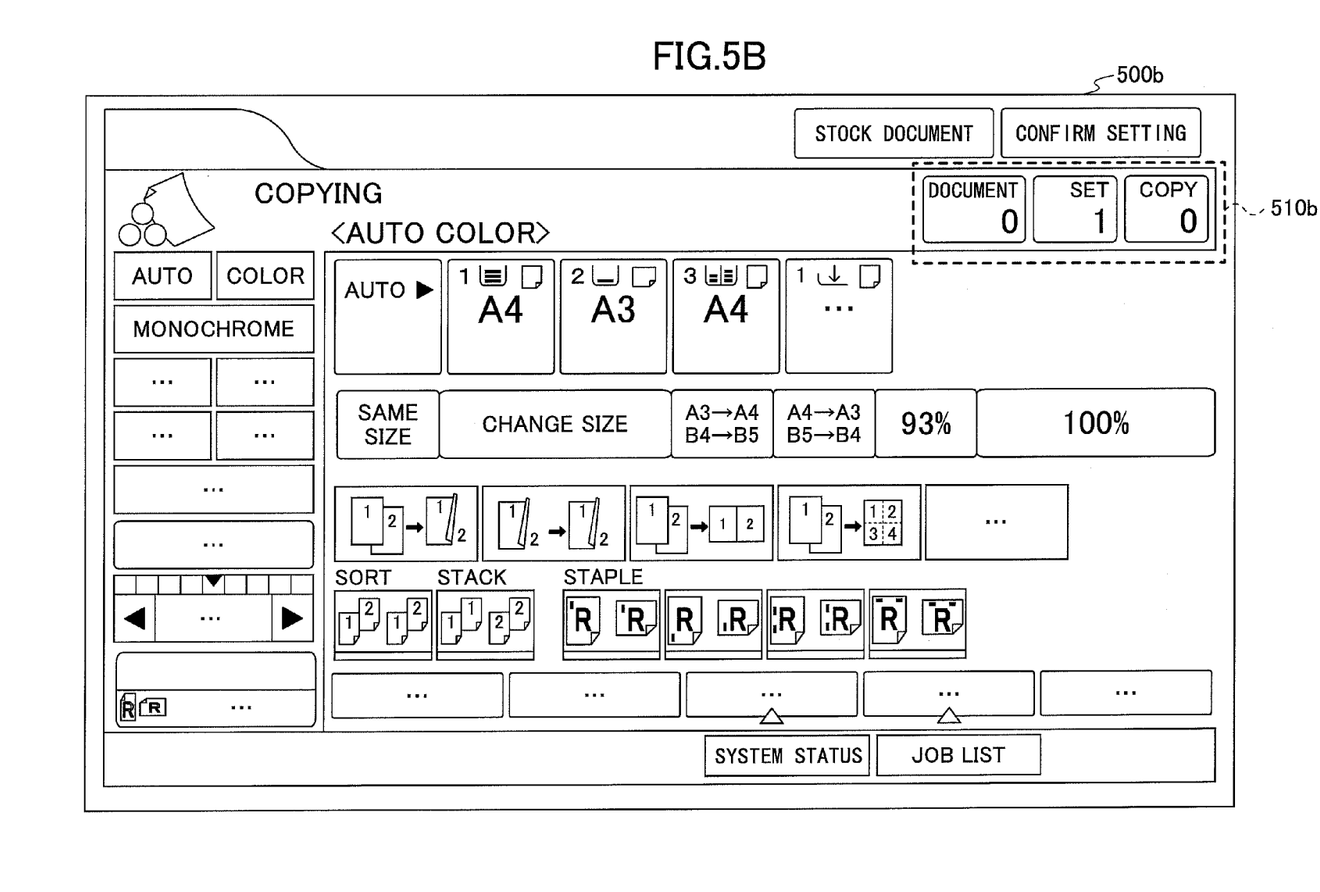
Figure 5C:
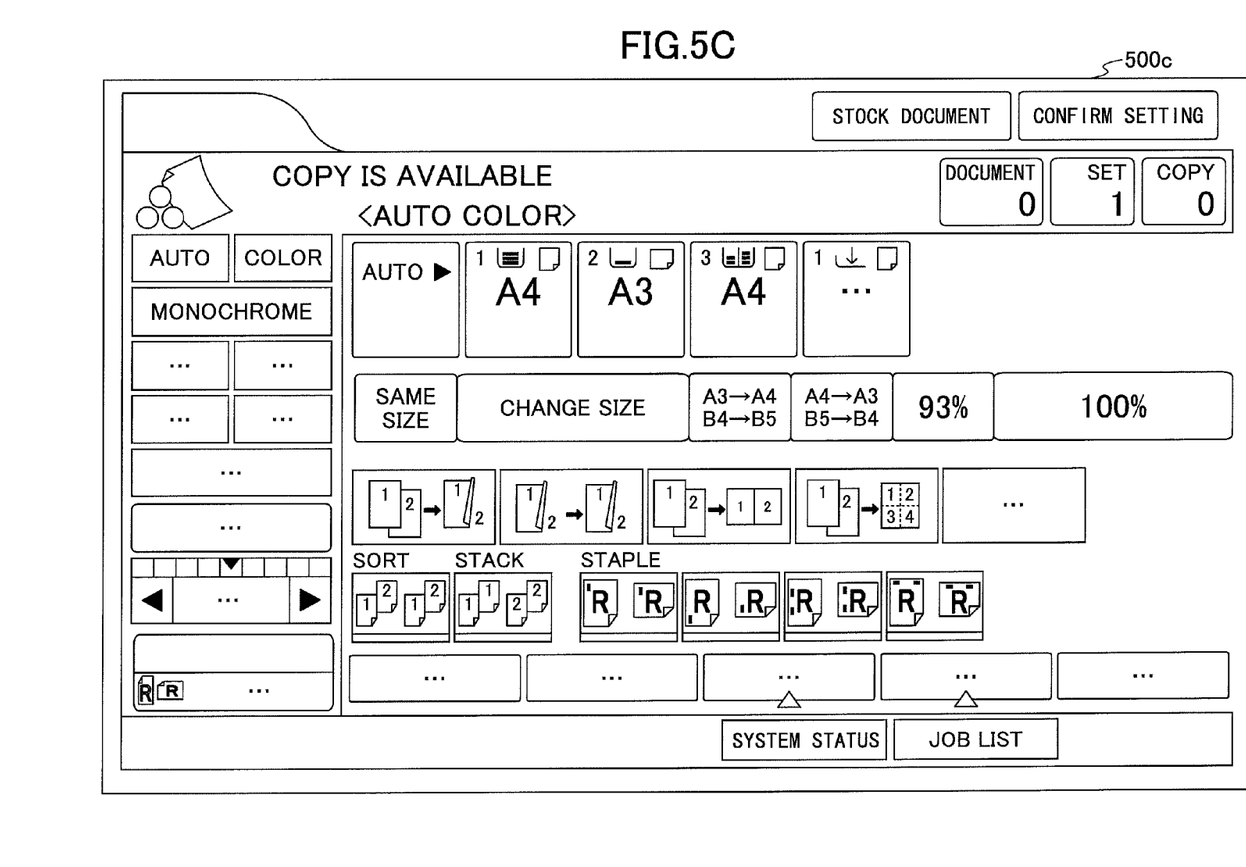

FIG. 5A to FIG. 5C are views illustrating an example of screen transitions. FIG. 5A illustrates an SDK copy operation screen 500a, and FIG. 5B illustrates a job status reporting screen 500b displayed by the copy application 1213. The job status reporting screen 500b includes an area 510b or the like for displaying a status of the copy job such as a progress status of the copy job (the number of read documents, the number of copied documents or the like), or the like.

FIG. 5C illustrates an example of an operation screen 500c (hereinafter, referred to as a "standard copy operation screen 500c") of the copy application 1213. When the copy application 1213, not the SDK copy application 1221, is selected as application to be used for displaying an operation screen, the standard copy operation screen 500c illustrated in FIG. 5C is transited to the job status reporting screen 500b illustrated in FIG. 5B. That is, the copy application 1213 controls the image forming apparatus 10 to perform a process (copy job) in accordance with the job parameter (setting data) input via the standard copy operation screen 500c and also controls the image forming apparatus 10 (operation panel 15) to display the job status reporting screen 500b while the copy job is being performed.

In this embodiment, the operation screen 500c and the job status reporting screen 500b of the copy application 1213 are substantially the same except that messages are different. That is, the operation screen 500c of the copy application 1213 is used also as the job status reporting screen 500b. However, alternatively, these screens may be completely differently implemented, for example.

Referring back to FIG. 4, subsequently, the copy application 1213 requests starting of the copy job to the control service 124 (S124). The control service 124 controls the scanner 12, the printer 13 or the like to have the image forming apparatus 10 perform processes relating to the copy job in accordance with the starting request of the copy job.

While the copy job is being performed, the control service 124 sequentially reports a change of the status of the copy job in accordance with a change of the progress status of the copy job, generation of an error, or the like to the copy application 1213 (S125-1, S125-2). The copy application 1213 controls the image forming apparatus 10 to perform a process corresponding to the change of the status in accordance with the report of the change of the status of the copy job. For example, a displayed content of the job status reporting screen 500b is updated. Specifically, a displayed content in the area 510b such as the number of read documents, the number of copied documents or the like is updated. Further, when generation of an error such as a paper jam or the like is reported, the copy application 1213 controls the image forming apparatus 10 to display a screen for reporting the error.

The copy application 1213 transmits the change of the status of the copy job to the SDK platform 123 (S126-1 and S126-2). Then, the SDK platform 123 transmits the status of the copy job to the SDK copy application 1221 (S127-1 and S127-2). As the change of the status of the copy job is transmitted to the SDK platform 123 and the SDK copy application 1221, a process specific to the SDK copy application 1221 can be performed by the image forming apparatus 10 in accordance with the change of the status of the copy job.

Meanwhile, when intermission of the copy job is input, such as a stop key (stop button) is pushed by the user or the like, an event that the stop key is pushed is reported from the control service 124 to the copy application 1213, that is the current owner. At this time, the copy application 1213 performs a control to intermit the copy job.

As such, control of the copy job is transferred to the copy application 1213 so that process control in accordance with a change in status while performing the copy job can be performed by the implementation of the copy job. That is, a necessity of such implementation for the SDK platform 123 is lowered.

When completion of the copy job is reported from the control service 124 (S128), the copy application 1213 requests the control service 124 to transfer the owner of the operation panel 15 by designating the application ID of the SDK platform 123 (S129). The control service 124 requests the copy application 1213 to release the owner (S130). When it is possible to release the owner, the copy application 1213 sends back a response indicating that the owner is to be released to the control service 124 (S131).

Subsequently, the control service 124 requests the SDK platform 123 that corresponds to the application ID designated in the request of transition of the owner in step S129 to transit to be the owner (S132). The SDK platform 123 sends back a response indicating that the owner is to be transited, to the control service 124 (S133).

Subsequently, the control service 124 reports a fact that the owner is transited by designating the application ID of the SDK platform 123, that is the new owner, to the copy application 1213 and the SDK platform 123, respectively (S134 and S135). Here, the SDK platform 123 requests the SDK copy application 1221, which is selected as application to be operated or used among the SDK application 122, to display the operation screen. The SDK copy application 1221 displays the SDK copy operation screen 500*a* as illustrated in FIG. 5A on the operation panel 15 via the SDK platform 123 and the control service 124 in response to the request. That is, the screen is automatically changed from the job status reporting screen 500*b* to the SDK copy operation screen 500*a* in accordance with the completion (end) of the copy job. Thus, from user point of view, the screen goes back to the initial state where the SDK copy application 1221 is selected to be used.

Subsequently, the copy application 1213 reports the end of the copy job to the SDK platform 123 (S136). Then, the SDK platform 123 reports the end of the copy job to the SDK copy application 1221 (S137).

In the above embodiment, the copy job is explained. Alternatively, the same control may be performed for jobs of the other standard application 121 such as the scan job, the print job, the facsimile sending and receiving job, or the like. At this time, each of the standard application 121 may include an API equivalent to the copy API 1213*a* of the copy application 1213.

As described above, according to the embodiment, control of a job for which a request to perform is made to the SDK application 122 can be transferred to the standard application 121. Thus, a necessity to implement complicated processes relating to control or management of a job for both the standard application 121 and the SDK platform 123 can be lowered. In other words, such an implementation can be only made to the standard application 121. As a result, efficiency in developing the entirety of the software of the image forming apparatus 10 can be improved.

Further, as the implementation of the SDK platform 123 relating to a function of the standard application 121 is common with the implementation of the standard application 121, occurrence of time lag between the standard application 121 and the SDK application 122 can be prevented.

That is, for example, when new hardware is added to the image forming apparatus 10, the standard application 121 is prepared to provide a function using the new hardware after a process corresponding to the new hardware is completed in the control service 124. On the other hand, it is necessary to implement an API for using the new hardware in the SDK platform 123 for the SDK application 122 to be prepared to provide the function using the new hardware. Thus, there has been a case in which time lag occurs between when the standard application 121 capable of using the function of the new hardware is released and when SDK application 122 capable of using the function of the new hardware is released.

However, according to the embodiment, when the standard application 121 is prepared to provide the function using the new hardware, the SDK application 122 can correspond to the new hardware because the SDK application 122 can transfer the control of the job to the standard application 121.

Although the image forming apparatus 10 is exemplified as an example of the data processing apparatus, another data processing apparatus other than the image forming apparatus 10 may be used instead, provided that the data processing apparatus is operable by a control of the program. For example, the data processing apparatus may be a computer such as a Personal Computer (PC) or the like, a projector, a digital camera, a mobile phone, a smartphone, a tablet terminal, a video conference system or the like.

In this embodiment, the control service 124 is an example of a reporting unit.

The individual constituents of the image forming apparatus 10 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

Although a preferred embodiment of the image forming apparatus has been specifically illustrated and described, it is to be understood that minor modifications may be made therein without departing from the spirit and scope of the invention as defined by the claims.

The present invention is not limited to the specifically disclosed embodiments, and numerous variations and modifications and modifications may be made without departing from the spirit and scope of the present invention.

The present application is based on and claims the benefit of priority of Japanese Priority Application No. 2012-204253 filed on Sep. 18, 2012, the entire contents of which are hereby incorporated by reference.

What is claimed is:

1. A data processing method performed by a data processing apparatus including a first program and a second program, wherein the first program causes the data processing apparatus to perform a display of a first screen, on an operation panel, relating to a process using a hardware resource specific to the data processing apparatus for inputting setting data relating to the process using the hardware resource via the first screen, causes the data processing apparatus to perform the process using the hardware resource in accordance with the setting data input via the first screen, includes an interface that receives setting data relating to the process using the hardware resource from a second program, the method comprising:

receiving, by the first program, the setting data from the second program, the setting data being input via a second screen displayed by the data processing apparatus caused by the second program as an owner of the operation panel;

causing, by the first program, the data processing apparatus to perform the process in accordance with the setting data received from the second program;

requesting, by the first program, transition of the owner of the operation panel to the first program;

after a response from the second program indicating that the owner of the operation panel is to be released, transiting the owner of the operation panel to the first program; and causing, by the first program, the data processing apparatus to transit the second screen to a screen displaying a status of the process while the process is being performed.

2. The data processing method according to claim 1, wherein the data processing apparatus further includes a reporting unit, the method further comprising:

reporting, by the reporting unit, a change of status generated while the process is being performed to the first program that is having the data processing apparatus display a screen; and causing, by the first program, the data processing apparatus to perform a process in accordance with the change of the status reported by the reporting unit.

3. The data processing method according to claim 1, wherein the first program and the second program are implemented by different development languages.

4. The data processing method according to claim 1, wherein the interface of the first program makes the functions of the first program usable by other programs.

5. The data processing method according to claim 1, wherein the data processing apparatus further includes a reporting unit, the method further comprising:

receiving, by the reporting unit from the first program, the request of the transition of the owner of the operation panel to the first program;

requesting, by the reporting unit, the second program to release the owner;

receiving, by the reporting unit, the response from the second program to release the owner; and requesting, by the reporting unit, the first program to transit to be the owner.

6. The data processing method according to claim 5, further comprising:

upon receiving a report of completion of the process in accordance with the setting data received from the second program, requesting, by the first program to the reporting unit, releasement and transition of the owner of the operation panel from the first program; and upon receiving a request to release the owner from the reporting unit, releasing, by the first program, the owner of the operation panel.

7. A data processing apparatus including a memory, the data processing apparatus comprising:

a first program stored in the memory and a second program stored in the memory, wherein the first program causes the data processing apparatus to perform a display of a first screen, on an operation panel, relating to a process using a hardware resource specific to the data processing apparatus for inputting setting data relating to the process using the hardware resource via the first screen, causes the data processing apparatus to perform the process using the hardware resource in accordance with the setting data input via the first screen, includes an interface that receives setting data relating to the process using the hardware resource from the second program, receives the setting data from the second program, the setting data being input via a second screen displayed on the operation panel by the data processing apparatus caused by the second program as an owner of the operation panel, causes the data processing apparatus to perform the process in accordance with the setting data received from the second program, requests transition of the owner of the operation panel to the first program, after a response from the second program indicating that the owner of the operation panel is to be released, transits the owner of the operation panel to the first program, and causes the data processing apparatus to transit the second screen to a screen displaying a status of the process while the process is being performed.

8. The data processing apparatus according to claim 7, further comprising:

a reporting unit that reports a change of status generated while the process is being performed to the first program that is having the data processing apparatus display a screen, and wherein the first program causes the data processing apparatus to perform a process in accordance with the change of the status reported by the reporting unit.

9. The data processing apparatus according to claim 7, wherein the first program and the second program are implemented by different development languages.

10. The data processing apparatus according to claim 7, wherein the interface of the first program makes the functions of the first program usable by other programs.

11. The data processing apparatus according to claim 7, further comprising:

a reporting unit that receives, from the first program, the request of the transition of the owner of the operation panel to the first program, requests the second program to release the owner, receives the response from the second program to release the owner, and requests the first application to transit to be the owner.

12. The data processing apparatus according to claim 11, wherein the first program upon receiving a report of completion of the process in accordance with the setting data received from the second program, requests, to the reporting unit, releasement and transition of the owner of the operation panel from the first program, and upon receiving a request to release the owner from the reporting unit, releases the owner of the operation panel.

13. A non-transitory computer-readable recording medium having recorded thereon a first program, wherein the first program causes a data processing apparatus including a memory to perform a display of a first screen, on an operation panel, relating to a process using a hardware resource specific to the data processing apparatus for inputting setting data relating to the process using the hardware resource via the first screen, causes the data processing apparatus to perform the process using the hardware resource in accordance with the setting data input via the first screen, includes an interface that receives setting data relating to the process using the hardware resource from a second program stored in the memory of the data processing apparatus, receives the setting data from the second program, the setting data being input via a second screen displayed on the operation panel by the data processing apparatus caused by the second program as an owner of the operation panel, causes the data processing apparatus to perform the process in accordance with the setting data received from the second program, requests transition of the owner of the operation panel to the first program, after a response from the second program indicating that the owner of the operation panel is to be released, transits the owner of the operation panel to the first program, and causes the data processing apparatus to transit the second screen to a screen displaying a status of the process while the process is being performed.

14. The non-transitory computer-readable recording medium according to claim 13, wherein the first program upon receiving a report of completion of the process in accordance with the setting data received from the second program, requests releasement and transition of the owner of the operation panel from the first program, and upon receiving a request to release the owner from the reporting unit, releases the owner of the operation panel.

* * * * *